(12) United States Patent
Grupp et al.

(10) Patent No.: US 10,603,992 B2
(45) Date of Patent: Mar. 31, 2020

(54) DOOR SYSTEM FOR A PASSENGER CAR HAVING AT LEAST TWO SEAT ROWS AND METHOD FOR OPERATING SUCH A DOOR SYSTEM

(71) Applicant: Bayerische Motoren Werke Aktiengesellschaft, Munich (DE)

(72) Inventors: Markus Grupp, Unterschleissheim (DE); Bernhard Scholz, Landshut (DE); Reinhard Peis, Zolling (DE); Johann Aigner, Neufahrn (DE); Josef Bloch, Groebenzell (DE); Pia Mondal, Kochel am See (DE); Horst Dietewich, Reichertshausen (DE); Daniel Schneider, Gaeufelden (DE); Daniel Stiglbauer, Mainburg (DE); Niklas Schwellenbach, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 74 days.

(21) Appl. No.: 15/877,832

(22) Filed: Jan. 23, 2018

(65) Prior Publication Data
US 2018/0147919 A1    May 31, 2018

Related U.S. Application Data

(63) Continuation of application No. PCT/EP2016/066864, filed on Jul. 15, 2016.

(30) Foreign Application Priority Data

Jul. 24, 2015  (DE) .......................... 10 2015 214 086

(51) Int. Cl.
*B60J 5/04*    (2006.01)
*E05F 15/00*   (2015.01)
(Continued)

(52) U.S. Cl.
CPC .............. *B60J 5/0479* (2013.01); *E05F 15/00* (2013.01); *E05F 15/70* (2015.01); *E05B 83/38* (2013.01);
(Continued)

(58) Field of Classification Search
CPC ......... B60J 5/0479; E05F 15/00; E05F 15/70; E05F 15/611; E05B 83/38; E05Y 2900/531
(Continued)

(56) References Cited

U.S. PATENT DOCUMENTS 3,652,124 A  *  3/1972  Tronville ................... B60J 5/06
                                                   296/146.12
6,966,600 B2    11/2005 Moriyama
(Continued)

FOREIGN PATENT DOCUMENTS

DE         18 00 784        6/1970
DE    10 2010 003 755 A1   10/2011
(Continued)

OTHER PUBLICATIONS

International Search Report (PCT/ISA/210) issued in PCT Application No. PCT/EP2016/066864 dated Oct. 10, 2016 with English translation (Four (4) pages).
(Continued)

*Primary Examiner* — Gregory A Blankenship
(74) *Attorney, Agent, or Firm* — Crowell & Moring LLP

(57) ABSTRACT

A door system is provided for a passenger vehicle having at least two seat rows. The door system includes a front side door of a corresponding vehicle side, which can be brought into an open position from a closed position in order to take a seat in the rear seat row or to leave the rear seat row. In order to create a door system by which easier and more comfortable closing of the front side door is enabled, the (Continued)

front side door can be moved from the open position into the closed position by a door drive.

13 Claims, 2 Drawing Sheets

(51) Int. Cl.
  *E05F 15/70* (2015.01)
  *E05F 15/611* (2015.01)
  *E05B 83/38* (2014.01)
(52) U.S. Cl.
  CPC ....... *E05F 15/611* (2015.01); *E05Y 2900/531* (2013.01)
(58) Field of Classification Search
  USPC ..................................................... 296/146.4
  See application file for complete search history.

(56) References Cited

U.S. PATENT DOCUMENTS

| | | | |
|---|---|---|---|
| 7,438,346 B1* | 10/2008 | Breed .................. | E05C 17/203 296/146.12 |
| 8,740,284 B2* | 6/2014 | Freymann ............. | B60J 5/0479 296/146.4 |
| 8,777,295 B2* | 7/2014 | Charnesky ............. | B60J 5/0477 296/146.4 |
| 2005/0242618 A1* | 11/2005 | Menard .................. | E05F 15/43 296/146.4 |
| 2007/0152473 A1* | 7/2007 | Lechkun ................ | B60J 5/0479 296/146.12 |
| 2008/0296927 A1* | 12/2008 | Gisler .................... | E05F 15/43 296/146.4 |
| 2009/0160211 A1* | 6/2009 | Krishnan .................. | B60J 5/04 296/146.4 |
| 2010/0156139 A1* | 6/2010 | Herrmann ............. | E05F 15/611 296/146.4 |
| 2010/0179732 A1* | 7/2010 | Shahidi .................. | E05F 5/025 701/49 |
| 2012/0133175 A1* | 5/2012 | Charnesky ............... | B60J 10/40 296/146.4 |
| 2012/0179336 A1 | 7/2012 | Oakley | |
| 2012/0280531 A1 | 11/2012 | Charnesky | |
| 2014/0259938 A1* | 9/2014 | Choi ...................... | B60J 5/0468 49/226 |
| 2015/0283886 A1* | 10/2015 | Nania ..................... | E05F 15/73 296/146.4 |
| 2015/0330133 A1* | 11/2015 | Konchan ................ | E05B 81/14 296/146.4 |
| 2017/0328097 A1* | 11/2017 | Gruber .................. | E05C 17/006 |
| 2018/0147919 A1* | 5/2018 | Grupp .................... | B60J 5/0479 |
| 2019/0077233 A1* | 3/2019 | Ma ........................ | B60J 5/0488 |

FOREIGN PATENT DOCUMENTS

| | | |
|---|---|---|
| DE | 10 2013 009 921 A1 | 4/2014 |
| EP | 1 068 970 A1 | 1/2001 |

OTHER PUBLICATIONS

German-language Written Opinion (PCT/ISA/237) issued in PCT Application No. PCT/EP2016/066864 dated Oct. 10, 2016 (Five (5) pages).
German-language Search Report issued in counterpart German Application No. 10 2015 214 086.5 dated Feb. 11, 2016 with partial English translation (Fourteen (14) pages).

\* cited by examiner

DOOR SYSTEM FOR A PASSENGER CAR HAVING AT LEAST TWO SEAT ROWS AND METHOD FOR OPERATING SUCH A DOOR SYSTEM

CROSS REFERENCE TO RELATED APPLICATIONS

This application is a continuation of PCT International Application No. PCT/EP2016/066864, filed Jul. 15, 2016, which claims priority under 35 U.S.C. § 119 from German Patent Application No. 10 2015 214 086.5, filed Jul. 24, 2015, the entire disclosures of which are herein expressly incorporated by reference.

BACKGROUND AND SUMMARY OF THE INVENTION

The invention relates to a door system for a passenger car with at least two rows of seats. Furthermore, the invention relates to a method for operating such a door system.

A door system for a passenger car is already known from EP 1 068 970 A1, in which two side doors which are attached on opposite sides of a door portal on a respective side of the vehicle and open in opposite directions are provided. The two side doors border on each other at a butt joint in a respective closed position in the middle of the door portal. The door portal in this case is formed with no column between the two side doors, with the front side door covering the rear side door. Consequently, the front side door must first be brought from a closed position into an open position before the rear side door can be opened for sitting down on or exiting from the rear seat row.

Furthermore, a problem arises when getting into the interior of the passenger car and sitting down on the rear seat row in that the seat occupant occupying the space can indeed close the rear side door again, but the front side door usually cannot be closed again at all, or only with great effort. The same also holds for the occupants of the front seat row on the opposite side of the vehicle—especially in broader vehicles—and in particular for the driver. Thus, the driver must usually get out and walk around the vehicle to close the front side door.

The described situation is known not only for vehicles with the described opposing side doors, but also in particular for three-door vehicles with only one front side door through which a place on the rear seat row also needs to be occupied.

The object of the present invention is therefore to create a door system for a motor vehicle, as well as a corresponding method of operating such a door system, by which an easier and more comfortable closing of the front side door of the passenger car is made possible.

This and other objects are achieved according to the invention by a door system for a passenger car having at least two seat rows, comprising a front side door of a corresponding vehicle side, which can be brought into an open position from a closed position for sitting down on or exiting from the rear seat row, wherein the front side door is movable from the open position into the closed position by a door drive. This object is also achieved as well by a method for operating such a door system.

For an easier and more comfortable closing of the front side door of the passenger car, it is provided in the door system according to the invention that the side door can be moved from the open position into the closed position by way of a door drive. Thus, especially when a seat occupant sits down on the rear seat row, the corresponding front side door which likewise needs to be opened for the corresponding occupant to get in can be easily closed, namely, driven. In particular, when no one is sitting on the front passenger seat, the front passenger door can thus be easily closed, for example, without it having to be closed by the driver or the rear occupant in an uncomfortable manner with great effort or by leaving the car. Instead, this is done by the door drive according to the invention, which can be operated or activated in particular by the driver, but also if necessary by another occupant.

Of course, if necessary it is also contemplated to use the door drive in addition for the opening of the door. The present door system is suitable here not only for vehicles with opposing side doors, in which the front door covers the rear in the area of the mutual butt joint, but also in particular for three-door vehicles with only one front side door through which a place on the rear seat row needs to be occupied.

In an advantageous embodiment of the invention, the door drive also serves as a door brake, by means of which the side door is to be braked during its opening and held in the respective open position. Thus, the door drive is advantageously provided with a dual function.

In another embodiment of the invention, the activation of the door drive occurs by way of an activating element which can be operated by the driver. This may be in particular a central closing button or the like of the closing mechanism. Thus, the central closing button also preferably has a dual function.

Furthermore, it is advantageous when a closing mechanism is provided with respective door locks, by which the corresponding side doors are held in the closed position and which are to be unlocked by a respective inside activating element, wherein, after an activation of an enable function of the closing mechanism, the door lock of the front side door is to be unlocked by an activating element different from its activating element. This enables a simple and comfortable opening of the rear side door by first activating a corresponding enable function of the closing mechanism, after which the front side door, which is to be opened first, is to be unlocked by an additional activating element, different from its own activating element, which is normally located on the interior door paneling of the corresponding door. This makes possible a remote unlocking of the first, preferably front, door, covering the rear door. After this, the door lock of the second, rear door can then be unlocked or opened. On the whole, an easier and more comfortable opening of the rear side door results.

The activating element different from the actual activating element of the front side door by which the front door is then to be opened after the activation of the enable function can be, for example and in particular, the activating element of the rear door. But alternatively to this, other activating elements are also contemplated which make possible an unlocking of the door lock of the front door which covers the rear door. Accordingly, the activating element could also be a switch or the like situated elsewhere. The arrangement, design and position of the activating element or switch, or also a cable or the like, to trigger the enabling and the unlocking function is not specified and may be chosen basically freely and arranged inside the vehicle. Furthermore, the same button can also be provided for the enabling and unlocking. Moreover, the number of activations for the enabling, unlocking and exiting is not specified and may be chosen arbitrarily.

Furthermore, it is advantageous when, after the activation of the enable function of the locking mechanism, the door lock of the front side door is to be unlocked by a first movement of the activating element of the door lock of the rear side door and then the door lock of the rear side door is to be unlocked by a further movement of this activating element. In this way, an intuitively activatable opening possibility is also achieved for the entire door system.

The benefits mentioned above in connection with the door system according to the invention likewise apply to the method of operating such a door system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
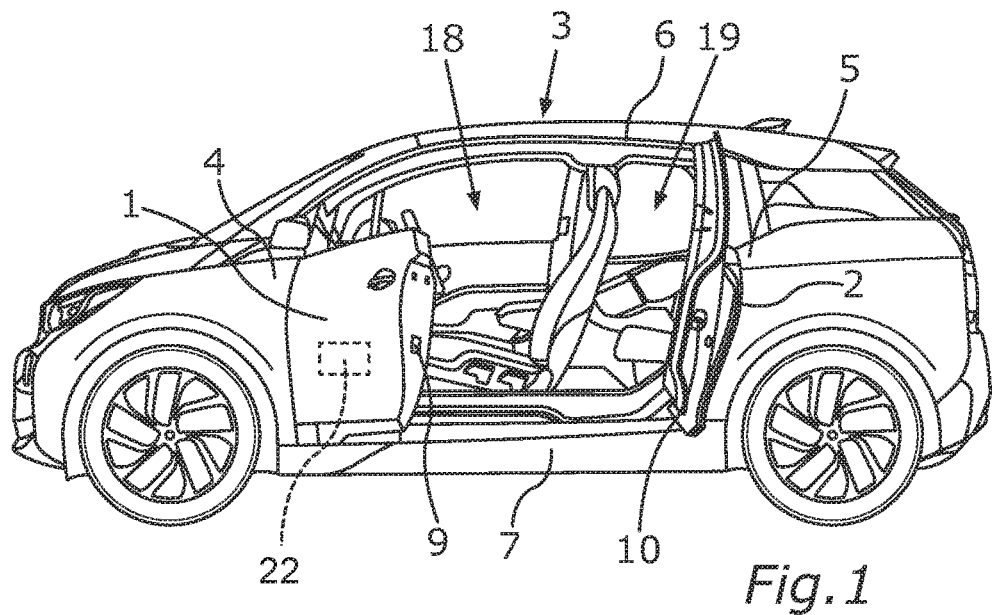
FIG. 1 is a side view of a passenger car with a door system having front and rear side doors, which are attached on two opposite sides of a door portal and are to open in opposite directions, being shown in their respective open position.
Figure 2:
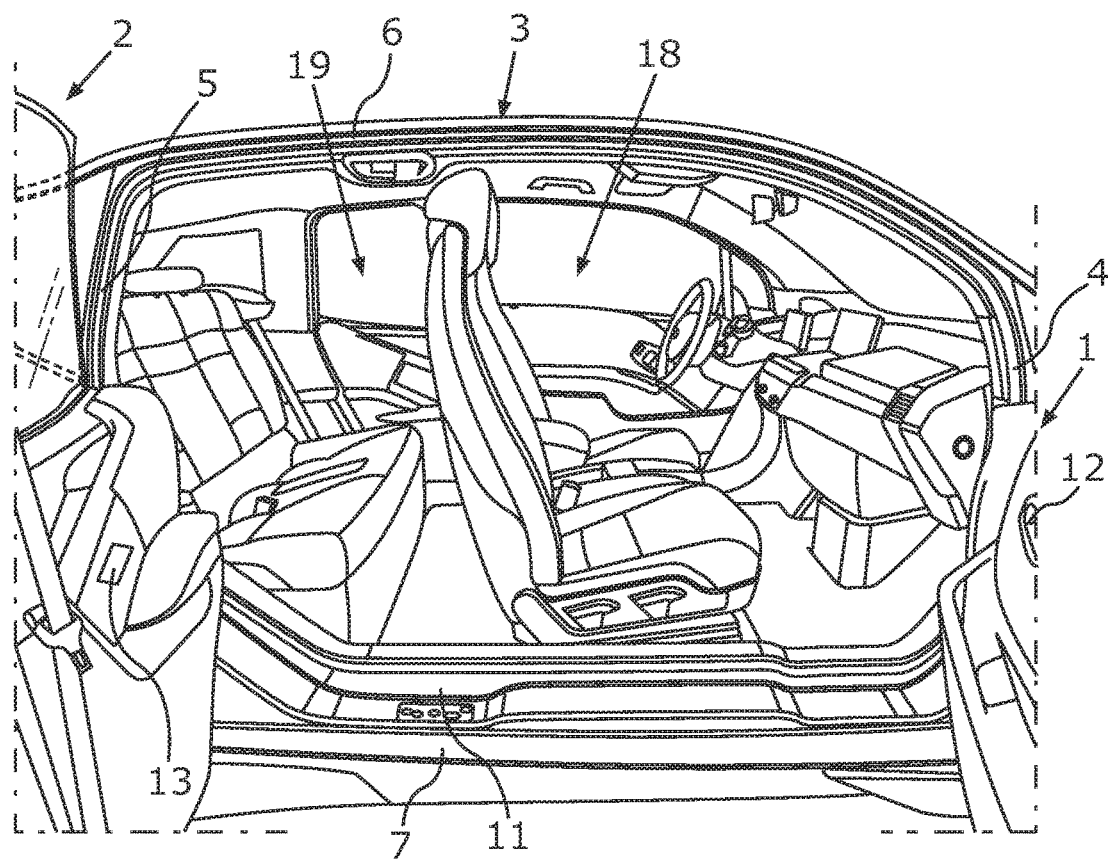
FIG. 2 is another side view of the door system similar to FIG. 1, wherein the two side doors are shown in their respective open position and border on each other at a butt joint in their respective closed position, in which the rear side door is covered by the front side door, wherein the front side door can be moved from the open position into the closed position via a door drive.

FIGS. 1 and 2 each show in a side view a passenger car with a front and a rear seat row 18, 19 from its driver side and its passenger side, respectively. This passenger car includes on each side of the vehicle a respective door system with a front side door 1 and a rear side door 2, which are attached to opposite sides of a door portal 3 and, accordingly, are to be opened in opposite directions. The door portal 3 on each side of the vehicle is formed substantially by a corresponding front and rear door column 4, 5, a roof frame 6, and a side sill 7. The front side door 1 is in this case mounted so as to pivot on the front door column 4 (A-column) and the rear side door 2 on the rear door column 5 (C-column), and they are represented in the present case in their respective open position. However, it would also be theoretically possible in the present door system for at least one sliding door or swiveling sliding door to be used.

Figure 3:
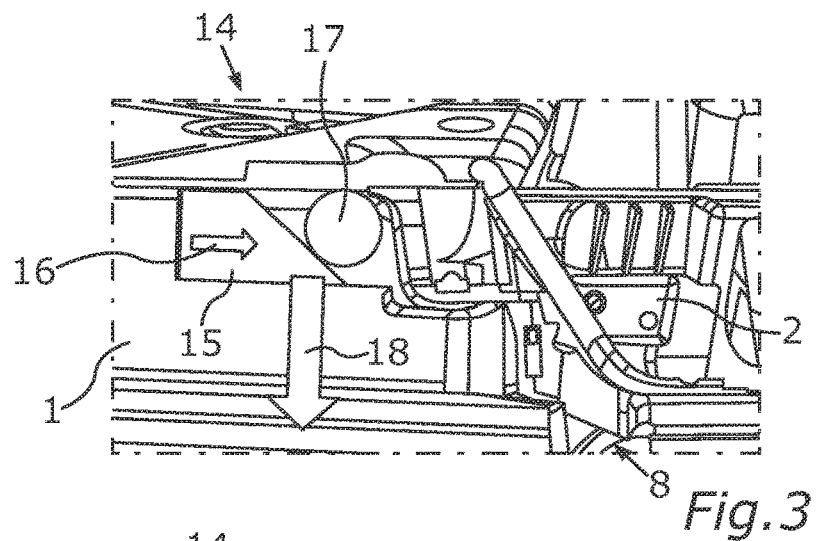
FIG. 3 is a partial cross-sectional view through the door system in the region of the butt joint between the front and rear side door along a horizontally running sectioning plane, wherein the two doors are represented in their closed position and a driver element is provided at the front side door and a driver element of an opening mechanism is provided at the rear side door.

In their respective closed position, the two side doors 1, 2 border on each other in the region of a butt joint 8, recognizable in FIG. 3. FIG. 3 shows here the door system with closed side doors 1 and 2 in the region of the butt joint 8 in a cross-section view along a horizontal sectioning plane, i.e. one extending in the longitudinal or in the transverse direction of the vehicle. Since the two side doors 1, 2 thus border on each other in the region of the butt joint 8, the door portal 3 is consequently formed with no column, i.e. without a B-column between the two side doors 1 and 2. For this reason, it is also necessary for the one, in the present case the front, side door 1 to cover the other, in the present case the rear, side door 2 in the closed position. In other words, first of all the front side door 1 accordingly needs to be opened before the rear side door 2 can then be opened. Vice versa, the rear side door 2 must be closed first of all before the front side door 1 can be brought from the open position into the closed position.

Furthermore, the door system includes a closing mechanism, which is part of a central closing system. This closing mechanism in the present case comprises a respective door lock, by which the front and rear side door 1, 2 can be closed. Of the door lock of the front side door 1, one can see in FIG. 1 in this case a lock housing 9 on the end side of the side door 1 facing the butt joint 8 and a striker 10 likewise arranged on the end side of the rear side door 2, which in the closed position of the two side doors 1, 2 bring about a locking of the front side door 1. Of the door lock of the rear side door 2, one can see a striker 11 at the top of the side sill 7, which interacts with a lock housing 9 arranged at the lower end side of the rear side door 2.

According to the closing sequence for the side doors 1, 2 of the present door system, at first the door lock of the rear side door 2 must be locked before the door lock of the front side door can then be locked accordingly. Vice versa, when opening the two doors 1, 2, at first the door lock of the front side door 1 and then the door lock of the rear side door 2 must be unlocked. For this, in the present case, corresponding rotary latches are provided at the respective lock housing 9, which interact with the strikers 10 and 11 of the corresponding door locks. The respective door locks are to be opened by respective corresponding inside activating elements 12, 13, which are usually also called door handles. The door handle or the activating element 12 of the front side door 1 is integrated here in the interior paneling of the front side door 1 and the activating element 13 or the door handle of the rear side door 2 is integrated correspondingly in its door paneling.

Now, in order to make it possible for an occupant of the rear seat row 19 of the vehicle to get out easily, in the present closing mechanism an enable function can be activated, so that the door lock of the first, front side door 1 is to be activated not only by its own activating element 12, but also additionally by another activating element. After activation of the enable function of the closing mechanism, the door lock of the front side door 1 is thus provided to unlock the door lock of the front side door 1, for example by the activating element 13, which properly serves for the opening of the rear side door 2 and is integrated here in its door paneling. This can then be accomplished, for example, in that the door lock of the front side door 1 is at first unlocked, so that it can be opened, in a first movement upon activating the activating element 13 of the door lock of the second, rear side door 2. In a further movement of the activating element 13 of the rear side door 12, the latter may then be opened.

Alternatively, however, it is also contemplated to make use of another activating element for its opening after the activation of the enable function of the closing mechanism—however not the activating element 12 actually provided for the door lock of the front side door 1. For example, it would also be possible in this case to provide a separate activating element in the region of the dashboard, the central console or the like. It is clear here that this might not only be an activating element in the form of a handle or a mechanical switch, but also that an electrical signaling would be possible. In any case, the result should be accomplished that, after the activation of the enable function of the closing mechanism, it should be possible to open the door lock of the front side door 1 in a different manner than by the actually provided activating element 12.

The activation of the enable function of the closing mechanism may occur, for example and in particular, by an activating element which can be operated by the driver. For this, one may use for example a central closing button or the like of the central closing mechanism, which is present anyway and which can be used normally to lock and unlock the entire central locking system or all the door locks together in a central manner. Of course, a different switch allocation or the like is also contemplated.

Accordingly, when in the present case a seat occupant of the rear seat row 19 of the vehicle would like to get out, the central closing button of the vehicle is at first operated by the driver and thus the enable function of the closing mechanism is activated. If the seat occupant of the rear seat row 19 of the vehicle now activates for a first time or with a first movement the activating element 13, which is easily within his grasp and provided in fact for the opening of the door lock of the rear side door 2, the door lock will be unlocked thereby in the manner described further below when discussing FIGS. 3 to 5. If the seat occupant of the rear seat row 19 of the vehicle then activates for another time or with another movement the activating element 13 of the corresponding rear side door 2 which is adjacent to him, the unlocking of the door lock of the rear side door 2 will also occur, so that both side doors are now unlocked. Since the front side door 1 covers the rear side door 2, the seat occupant of the rear seat row 19 of the vehicle may now also push open the front side door 1 by swiveling the rear side door 2—due to the overlapping with the front side door 1 in the region of the butt joint 8. Thus, the seat occupant of the rear seat row 19 of the vehicle may easily leave the vehicle.

Figure 4:
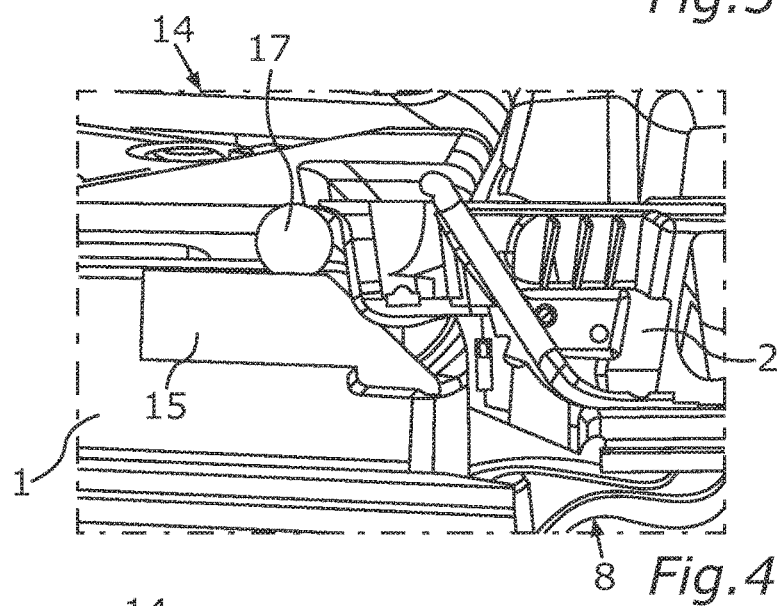
FIG. 4 is a cross-sectional view through the door system of FIG. 3, wherein by displacement of the driver element the front side door has been partly opened relative to the rear side door via the contact point with the driver element.
Figure 5:
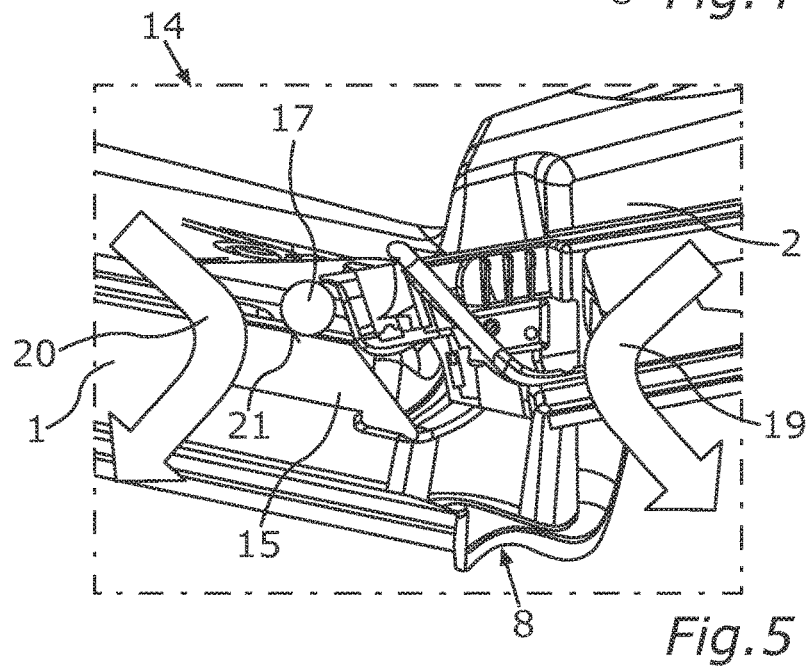
FIG. 5 is a cross-sectional view through the door system of FIGS. 3 and 4, wherein, after activation of the activating element of the rear side door, this door can now also be swiveled out and opened further by the opening mechanism by the swiveling of the rear side door onto the front side door.

FIGS. 3 to 5 shall now be used to explain an opening mechanism 14 by which the side doors 1, 2 can be opened especially easily. In this case, FIG. 3 shows—as already explained above—a horizontal cross-section view of the door system (or the two side doors 1, 2), which are each located in their closed position, in the region of the butt joint 8. One notices here on the side of the front side door 1 a driver element in the form of a wedge element, which can move backward according to an arrow 16 in the longitudinal direction of the vehicle, i.e. in the direction of the second side door 2. For this, the wedge element 15 is biased for example with the force of a spring element or can be moved by a corresponding actuator. Furthermore, the opening mechanism 14 includes a driver element in the form of a roller element, which is arranged on the side of the rear side door 2. By displacement of the wedge element 15 along the arrow 16, the front side door 1 may thus be partly opened relative to the rear side door 2 via the contact point with the driver element 17, if the activating element 13 has previously been activated with the first movement and accordingly the door lock of the front side door 1 has been unlocked. Thus, thanks to the driver element 15 which is biased by a spring element or the like, the front side door 1 is forced out from the corresponding door lock and attains the partly opened position as shown in FIG. 4, while the rear side door 2 continues to be in the closed position. After the activating element 13 of the rear side door 2 has been activated once more with the second movement, by which the door lock of the rear side door 2 has been unlocked, the front side door 1 can now also be opened along an arrow 20 as shown in FIG. 5 by swiveling the rear side door 2 along an arrow 19, since the front side door 1 is overlapping with the rear side door 2 in the region of the butt joint 8 and since the driver element 17 of the opening mechanism 14 can then interact with a longitudinal side 21 of the wedge element 15, so that hereby a further swiveling of the front side door 1 can occur by means of the rear side door 2. Thus, the occupant of the rear seat row 19 of the vehicle can push open the front side door 1 with the rear side door 2 and easily get out. Of course, it would also be possible to open the front side door 1 independently of the movement of the rear side door 2 with an adjusting element.

After getting out, the rear side door 2 may at first be closed once more before the front side door 1 can then be closed.

Now, if an occupant has taken a place on the rear seat row 19—with the side doors 1, 2 opened—they can close the rear side door 2 on the corresponding side, especially in manual fashion. But since, however, it is very uncomfortable and difficult for the occupant of the rear seat row 19, after having entered and taken a seat, to manually close the front side door 1 on the corresponding side, there is provided in the present case a door drive 22, only schematically indicated in FIG. 1, by which the front side door 1 can be moved from the open position into the closed position. This door drive 20 may be, for example, an electric motor. Of course, it may also be a spring accumulator element or a pneumatic or hydraulic actuator, which is tensioned or charged correspondingly upon opening the front side door 1, so that after activation of the door drive 20 the front side door 1 can be closed with a corresponding stored force. Of course, a different drive may also be used, by means of which the front side door 1 can be moved at least from the open position into the closed position. Optionally, it is also contemplated to use the door drive 20 in order to move the front side door 1 from the closed position into the open position. This may be done, for example, after the unlocking of the door lock of the front side door 1—as an alternative to the opening mechanism 14.

The door drive 20 may furthermore also serve as a door brake, by which the front side door 1 is to be braked during its opening and held in the respective open position.

The operating or activating of the door drive 20 may occur, for example, by use of an activating element that can be operated by the driver, especially by the central closing button or the like of the central closing mechanism, which is present anyway. Thus, this closing button in the present sample embodiment is provided not only for the activation of the enable function, but also for the activation on the door drive 20. Of course, another switch allocation or the like is also possible.

LIST OF REFERENCE NUMBERS 1 front side door
2 rear side door
3 door portal
4 door column
5 door column
6 roof frame
7 side sill
8 butt joint
9 lock housing
10 striker
11 striker 12 activating element
13 activating element
14 opening mechanism
15 wedge element
16 arrow
17 driver element
18 front seat row
19 rear seat row
20 arrow
22 door drive The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A door system for a passenger vehicle having at least two rows of seats, the door system comprising:
    a front side door of a corresponding vehicle side having a front side door activating element configured to at least unlock the front side door, wherein
        the front side door is brought into an open position from a closed position to allow for entering or exiting from the rear seat row, and
    a door drive operatively configured to move the front side door from the open position into the closed position;
    a rear side door of the corresponding vehicle side having a rear side door activating element configured to at least unlock the rear side door; and
    a closing mechanism provided with respective door locks, by which the front side door and the rear side door are held in the closed position, wherein
        after an activation of an enable function of the closing mechanism, a door lock of the front side door is to be unlocked by a first movement of an activating element different from the front side door activating element, and
        after the first movement, a door lock of the rear side door is to be unlocked by a second movement of said activating element different from the front side door activating element.

2. The door system according to claim 1, wherein
    the front side door and the rear side door are attached on two opposite sides of a door portal and are mounted to open in opposite directions, and
    the front side door and the rear side door border each other at a butt joint in their respective closed positions, in which case the front side door covers the rear side door.

3. The door system according to claim 1, wherein
the door drive is additionally configured as a door brake by which the front side door is to be braked during opening thereof and held in the respective open position.

4. The door system according to claim 2, wherein
the door drive is additionally configured as a door brake by which the front side door is to be braked during opening thereof and held in the respective open position.

5. The door system according to claim 1, wherein
the activating element different from the front side door activating element is a central closing button of the closing mechanism of the passenger vehicle.

6. The door system according to claim 1, wherein said activating element different from the front side door activating element is the rear side door activating element.

7. A method of operating a door system for a passenger vehicle having at least two rows of seats, the method comprising the acts of:
    providing a front side door on a corresponding vehicle side having a front side door activating element configured to at least unlock the front side door, the front side door being openable into an open position from a closed position to allow entry or exiting from the rear seat row;
    providing a rear side door of the corresponding vehicle side having a rear side door activating element configured to at least unlock the rear side door;
    moving the front side door from the open position into the closed position via a door drive;
    providing a closing mechanism with respective door locks, by which the front side door and the rear side door are held in the closed position;
    unlocking a door lock of the front side door, after an activation of an enable function of the closing mechanism, in response to a first movement of an activating element different from the front side door activating element; and
    unlocking a door lock of the rear side door, after the first movement, in response to a second movement of said activating element different from the front side door activating element.

8. The method according to claim 7, wherein
the front side door and the rear side door are attached on two opposite sides of a door portal and are mounted to open in opposite directions, and
the front side door and the rear side door border each other at a butt joint in their respective closed positions, in which case the front side door covers the rear side door.

9. The method according to claim 8, wherein
the door drive is additionally configured as a door brake by which the front side door is to be braked during opening thereof and held in the respective open position.

10. The method according to claim 9, further comprising the act of:
    activating, via an activating element operable by a driver, the door drive in order to move the front side door from the open position into the closed position.

11. The method according to claim 10, wherein
the activating element different from the front side door activating element is a central closing button of the closing mechanism of the passenger vehicle.

12. The method according to claim 7, wherein said activating element different from the front side door activating element is the rear side door activating element.

13. The method according to claim 7, wherein the activating element different from the front side door activating element is a central closing button of the closing mechanism of the passenger vehicle.

* * * * *